United States Patent
Vo et al.

(10) Patent No.: US 9,862,876 B2
(45) Date of Patent: Jan. 9, 2018

(54) METHODS AND COMPOSITIONS OF TREATING SUBTERRANEAN FORMATIONS WITH A NOVEL RESIN SYSTEM

(71) Applicant: Halliburton Energy Services, Inc., Houston, TX (US)

(72) Inventors: Loan Vo, Houston, TX (US); Feng Liang, Houston, TX (US); Philip D. Nguyen, Houston, TX (US); Tingji Tang, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 251 days.

(21) Appl. No.: 14/036,582

(22) Filed: Sep. 25, 2013

(65) Prior Publication Data

US 2014/0311745 A1  Oct. 23, 2014

Related U.S. Application Data

(63) Continuation-in-part of application No. 13/867,476, filed on Apr. 22, 2013.

(51) Int. Cl.
 *C09K 13/02* (2006.01)
 *C09K 8/575* (2006.01)
 (Continued)

(52) U.S. Cl.
 CPC ............ *C09K 8/5755* (2013.01); *C09K 8/805* (2013.01); *E21B 43/261* (2013.01); *C09K 2208/00* (2013.01)

(58) Field of Classification Search
 CPC .......... C09K 13/02; C09K 5/16; E21B 43/255
 (Continued)

(56) References Cited

U.S. PATENT DOCUMENTS 4,982,793 A  1/1991  Holtmyer et al.
5,067,565 A  11/1991  Holtmyer et al.
(Continued)

FOREIGN PATENT DOCUMENTS

WO  2012154473 A1  11/2012
WO  2014176011 A1  10/2014
WO  2014176078 A1  10/2014

OTHER PUBLICATIONS

International Search Report and Written Opinion for PCT/US2014/034175 dated Aug. 18, 2014.
(Continued)

*Primary Examiner* — Catherine Loikith
*Assistant Examiner* — Ashish Varma
(74) *Attorney, Agent, or Firm* — McDermott Will & Emery LLP

(57) ABSTRACT

Embodiments including methods of treating a subterranean formation comprising providing a solvent-based treatment fluid comprising a liquid resin agent, wherein the liquid resin agent comprises the reaction product of a multifunctional electrophilic compound comprising at least two electrophilic reactive groups and at least one nucleophilic compound selected from the group consisting of a dimer acid; a dimer diamine; any derivative thereof; and any combination thereof, and wherein the multifunctional electrophilic compound comprises at least two electrophilic reactive groups; introducing the solvent-based treatment fluid into the subterranean formation; and curing the liquid resin agent.

17 Claims, 1 Drawing Sheet

(51) Int. Cl.
*C09K 8/80* (2006.01)
*E21B 43/26* (2006.01)

(58) Field of Classification Search
USPC .......................................... 166/307
See application file for complete search history.

(56) References Cited

U.S. PATENT DOCUMENTS

| | | |
|---|---|---|
| 5,122,549 A | 6/1992 | Holtmyer et al. |
| 5,775,425 A | 7/1998 | Weaver et al. |
| 5,787,986 A | 8/1998 | Weaver et al. |
| 6,439,309 B1 | 8/2002 | Matherly et al. |
| 6,668,926 B2 | 12/2003 | Nguyen et al. |
| 6,692,200 B2 | 2/2004 | Peterson |
| 6,705,400 B1 | 3/2004 | Nguyen et al. |
| 6,729,404 B2 | 5/2004 | Nguyen et al. |
| 6,892,813 B2 | 5/2005 | Nguyen et al. |
| 7,114,570 B2 | 10/2006 | Nguyen et al. |
| 7,216,711 B2 | 5/2007 | Nguyen et al. |
| 7,264,052 B2 | 9/2007 | Nguyen et al. |
| 7,306,037 B2 | 12/2007 | Nguyen et al. |
| 7,318,474 B2 | 1/2008 | Welton et al. |
| 7,407,010 B2 | 8/2008 | Rickman et al. |
| 7,448,451 B2 | 11/2008 | Nguyen et al. |
| 7,727,938 B2 | 6/2010 | Ballard |
| 7,762,329 B1* | 7/2010 | Morgan ............... C09K 8/506 166/285 |
| 7,786,052 B2 | 8/2010 | Ballard |
| 7,883,740 B2 | 2/2011 | Nguyen et al. |
| 7,900,702 B2* | 3/2011 | Reddy ............... C09K 8/5086 166/276 |
| 8,163,677 B2 | 4/2012 | Endres et al. |
| 2007/0007010 A1 | 1/2007 | Welton et al. |
| 2010/0087566 A1 | 4/2010 | Ballard |
| 2010/0326660 A1* | 12/2010 | Ballard ............. C08G 59/5006 166/300 |
| 2011/0030949 A1 | 2/2011 | Weaver et al. |
| 2012/0061083 A1 | 3/2012 | Ballard |
| 2014/0311743 A1 | 10/2014 | Vo et al. |

OTHER PUBLICATIONS

International Search Report and Written Opinion for PCT/US2014/032686 dated Aug. 26, 2014.

* cited by examiner

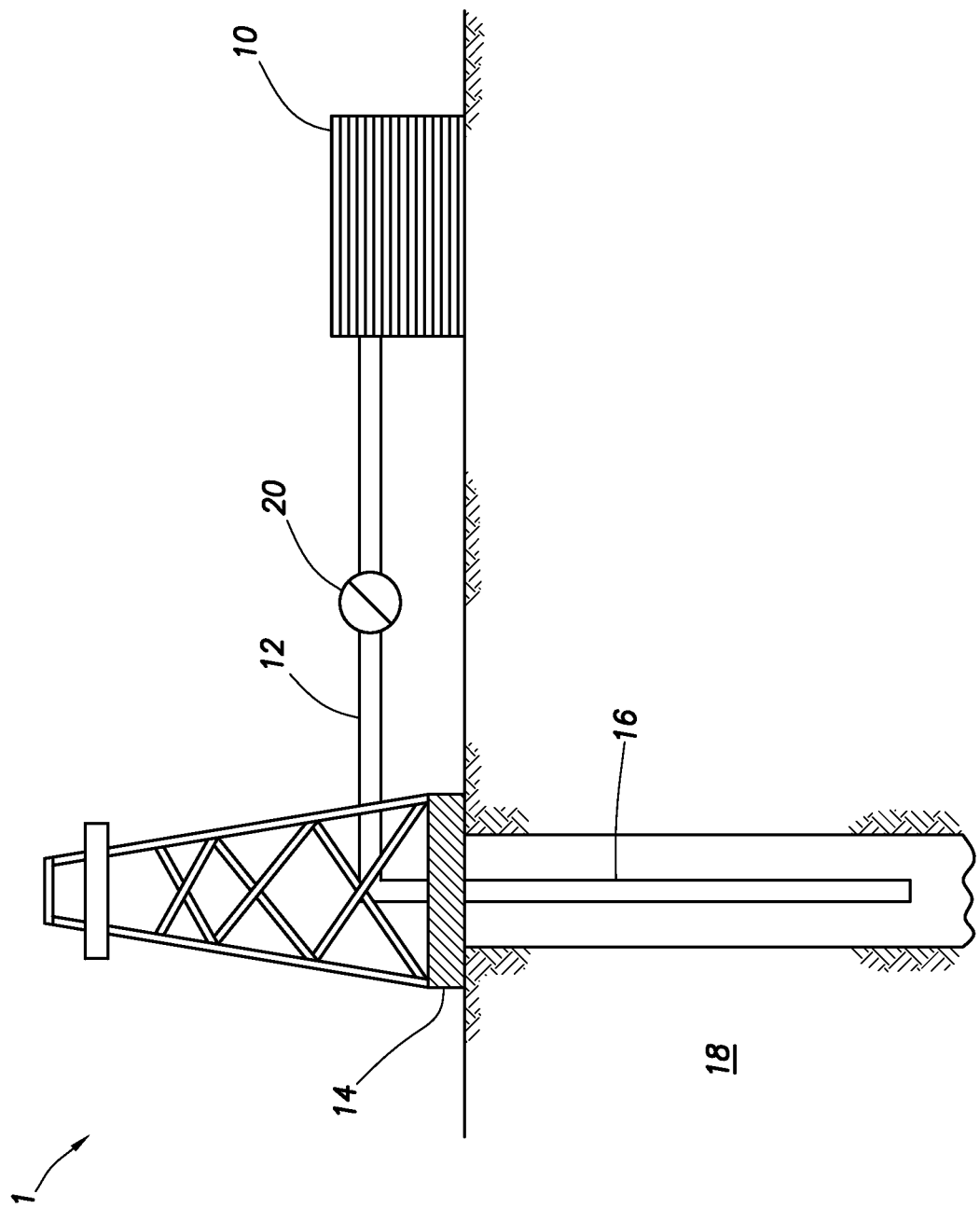

METHODS AND COMPOSITIONS OF TREATING SUBTERRANEAN FORMATIONS WITH A NOVEL RESIN SYSTEM

CROSS-REFERENCE TO RELATED APPLICATIONS

This application is a continuation-in-part of U.S. patent application Ser. No. 13/867,476, filed on Apr. 22, 2013.

BACKGROUND

The embodiments described herein relate to methods and compositions of treating subterranean formations with a novel resin system.

Subterranean wells are often stimulated by hydraulic fracturing treatments. In hydraulic fracturing treatments, a viscous treatment fluid is pumped into a portion of a subterranean formation at a rate and pressure such that the subterranean formation breaks down and one or more fractures are formed. While the treatment fluid used to initiate the fracture is generally solids-free, typically, particulate solids, such as graded sand, are introduced in a later portion of the treatment fluid and then deposited into the fracture. These particulate solids, (generally known as "proppant particulates" or, simply, "proppant") serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow.

Hydraulic fracturing of subterranean wells is often performed in formations that contain unconsolidated particulates. The unconsolidated particulates may migrate out of the subterranean formation and be produced with production fluids. The presence of unconsolidated particulates in a formation during production is undesirable because they may damage or abrade producing equipment or reduce well production. For example, unconsolidated particulates may migrate into wellbore casings, perforations, or the interstitial spaces between packed proppants within a fracture and clog or hinder well production. As used herein, the term "unconsolidated particulates" refers to any loose or loosely bonded particulates that may move through the formation with production fluids. Unconsolidated particulates may include, for example, sand, gravel, proppant particulates, and/or formation fines.

One method of controlling unconsolidated particulates in hydraulic fractured subterranean formations is to perform a gravel-packing treatment. In gravel-packing treatments, particulates are deposited into unconsolidated or weakly consolidated formation zones to create a physical barrier to the transport of unconsolidated particulates with the produced fluids. Typical gravel-packing treatments include placing a screen in a wellbore and packing the annulus between the screen and the wellbore with particulates of a certain size to prevent the transport of unconsolidated particulates with the produced fluids without compromising the conductivity of the well. Gravel-packing treatments, however, involve placement of additional unconsolidated particulates into the wellbore which may not be adequately maintained, for example, by a screen and which may, therefore, migrate along with the produced fluids, thus, contributing to the problem the gravel-packing treatment was attempting to solve.

Another method of controlling unconsolidated particulates is to treat the wellbore with a consolidating agent. In such treatments, a consolidating agent is placed into the wellbore in order to stabilize unconsolidated particulates, such as by providing a tacky substrate for unconsolidated particulates to adhere or by contacting unconsolidated particulates and curing into a hardened mass. As used herein, the term "tacky," in all its forms, refers to a substance that is at least somewhat sticky to the touch. Typically, the consolidating agent may be used to lock unconsolidated particulates in place and form at least a partially immobilized substance, which may be accomplished by enhancing grain-to-grain or grain-to-formation contact of the unconsolidated particulates.

The embodiments described herein provide a novel system for treating unconsolidated particulates that is capable of hardening to lock the particulates into place and that may additionally possess non-hardening qualities such that it provides a partial tacky substrate for further control of the particulates.

BRIEF DESCRIPTION OF THE DRAWINGS

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

The embodiments described herein relate to methods and compositions of treating subterranean formations with a novel resin system.

In some embodiments, methods of treating a wellbore in a subterranean formation with a solvent-based treatment fluid comprising a liquid resin agent are disclosed herein. The liquid resin agent is comprised of the reaction product of a multifunctional electrophilic compound having at least two electrophilic reactive groups and at least one nucleophilic compound selected from the group consisting of a dimer acid; a dimer diamine; and any combination thereof. The solvent-based treatment fluid is then introduced into the wellbore and the liquid resin agent is cured.

In those embodiments in which proppant particulates are coated with the liquid resin agent, the methods disclosed herein provide the advantage of permitting either dry-coating or wet-coating of the liquid resin agent onto the proppant particulates. The proppant particulates may be wet-coated directly in a blender tub or via the suction side of a discharge pump. In other embodiments, the liquid resin agent may be dry coated onto the proppant particulates via a sand screw. A combination of dry-coating and wet-coating may also be employed. For example, in some embodiments, the multifunctional electrophilic compound may be dry-coated onto the proppant particulates using a sand screw and the nucleophilic compound may be wet-coated thereupon using the suction side of a discharge pump. Additionally, the methods described herein may be used to coat the proppant particulates with the liquid resin agent on-the-fly at the wellbore site. As used herein, the term "on-the-fly" refers to performing an operation during a subterranean treatment that does not require stopping normal operations.

The methods described herein may be used in any subterranean formation operation that may benefit from the use of a resin system. Such operations may include, but are not limited to, well completions (e.g., hydraulic fracturing, gravel packing, and frac-packing operations); remedial proppant or gravel treatments; near-wellbore formation sand consolidation treatments; consolidation-while-drilling target interval operations; plug-and-abandonment operations, and the like. One of ordinary skill in the art, with the benefit of this disclosure, will recognize whether the liquid resin agent disclosed herein will be suitable in a particular subterranean operation.

As used herein, the term "multifunctional" refers to a molecule or compound carrying at least two different reactive groups. As used herein, the term "multifunctional electrophilic compound" refers to a molecule or compound carrying at least two different reactive electrophilic groups capable of reacting with at least one nucleophilic group or compound. As used herein, the term "electrophilic group" or "electrophilic compound" refers to chemical species (e.g., atoms, molecules, ions, etc.) that behave as electron acceptors. As used herein the term, "nucleophilic group" or "nucleophilic compound" refers to chemical species (e.g., atoms, molecules, ions, etc.) that behave as electron donors.

An advantage of the use of multifunctional electrophilic compounds in the methods described herein is that they are capable of reacting with the nucleophilic compounds to provide a resin system. Additionally, because the multifunctional electrophilic compounds have at least two electrophilic groups, the amount of nucleophilic compound required to react with the multifunctional electrophilic compounds may be greatly reduced in the methods disclosed herein. Moreover, because of their multiple electrophilic reaction sites, the likelihood that a reaction will occur between the multifunctional electrophilic compounds and the nucleophilic compounds is greatly enhanced.

The multifunctional electrophilic compounds may serve as substrate-anchoring agents. That is, the multifunctional electrophilic compound may be capable of adhering to a substrate such as, for example, the surface of a fracture face in a subterranean formation or on proppant particulates. The ability of the multifunctional electrophilic compounds to anchor onto a substrate permits effective wet-coating of the liquid resin agents onto the formation or onto proppant particulates. Additionally, the multifunctional electrophilic compounds may serve to impart hardening, consolidating agent qualities to the liquid resin agents described herein. Suitable multifunctional electrophilic compounds may include, but are not limited to, a polyepoxide; an epoxy containing alkoxysilane; and any combination thereof.

Suitable polyepoxides for use as the multifunctional electrophilic compounds may include, but are not limited to, a bisphenol A diglycidyl ether; a bisphenol A-epichlorohydrin; a bisphenol F; novolak; a tetrabromobisphenol A; an aliphatic diepoxide (e.g., 1,4-di(oxiran-2-yl)butane); and any combination thereof. A suitable commercially available polyepoxide for use as the multifunctional electrophilic compounds in the methods disclosed herein may include, but is not limited to, Expedite® 225, Part A available from Halliburton Energy Services, Inc. in Houston, Tex.

Suitable alkoxysilanes for use as the multifunctional electrophilic compounds may be preferably epoxy containing and may be derived from the formula: $R_nR'_mSiX_{(4-n-m)}$, where R' is a nonhydrolyzable organic group functionalized with an epoxy end group, R is a nonhydrolyzable organic group, X is a hydrolyzable group, and n and m are integers, which may typically be between about 1 to about 4. The nonhydrolyzable organic group R may include, but is not limited to, an alkyl moiety; an ethyl moiety; a methyl moiety; a propyl moiety; a butyl moiety; a hexyl moiety; an octyl moiety; a benzyl moiety; a cyclohexyl moiety; and any combination thereof. The hydrolyzable group X may include, but is not limited to, an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

Suitable examples of an epoxy containing alkoxysilane multifunctional electrophilic compound that may be used in the methods described herein may include, but is not limited to, a glycidoxysilane (e.g., (3-glycidoxypropyl)triethoxysilane).

The nonhydrolyzable group R', which may be preferably functionalized with an epoxy end group, of the alkoxysilane for use as the multifunctional electrophilic compounds may react with the nucleophilic compounds to form the liquid resin agents disclosed herein. Suitable nucleophilic compounds for use may include, but are not limited to, a dimer acid (also referred to as a dimerized fatty acid); a dimer diamine; any derivative thereof; and any combination thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds.

The multiple reactive sites on the multifunctional electrophilic compounds described herein may permit interaction with more than one nucleophilic compound. Similarly, the nucleophilic compounds may react with more than one multifunctional electrophilic compound. For example, in some embodiments the liquid resin agent may be formed by the reaction product of a multifunctional electrophilic compound such as (3-glycidoxypropyl)triethoxysilane, and a nucleophilic compound such as a dimer acid. The resulting compound comprises a free carboxy acid group that may react with a second multifunctional electrophilic compound, followed by a condensation polymerization reaction to make a crosslinked product forming the liquid resin agent described herein.

In another example, in some embodiments the liquid resin agent may be formed by the reaction product of a multifunctional electrophilic compound such as (3-glycidoxypropyl)triethoxysilane, and a nucleophilic compound such as dimer diamine. The resulting compound comprises a free amine group that may react with a second multifunctional electrophilic compound, followed by a condensation polymerization reaction to make a crosslinked product forming the liquid resin agent described herein.

The liquid resin agent may exhibit enhanced compressive strength, as well as elasticity, when compared to conventional resin systems. Moreover, the liquid resin agent may exhibit the qualities of a non-hardening consolidating agent; a hardening consolidating agent; or a combination thereof. As used herein, the term "non-hardening consolidating agent" refers to a substance that is somewhat tacky (or may be activated to become so). As used herein, the term "hardening consolidating agent" refers to a substance that is not tacky after curing. The tacky nature of the non-hardening consolidating agent may enhance grain-to-grain or grain-to-formation contact of the unconsolidated particulates. Hardening consolidating agents may form a cohesive, flexible, and potentially permeable mass that immobilizes unconsolidated particulates. In some embodiments, the multifunctional electrophilic compound of the liquid resin agent described herein may impart hardening consolidating agent qualities to the liquid resin agent and the nucleophilic compound may impart non-hardening consolidating agent qualities to the liquid resin agent. Therefore, by adjusting the ratio of multifunctional electrophilic compound to nucleophilic compound to form the liquid resin agent, the prominence of either of the non-hardening consolidating qualities or hardening consolidating qualities may be manipulated.

In some embodiments, the ratio of the multifunctional electrophilic compound to the nucleophilic compound forming the liquid resin agent is about 1 to greater than about 6 (~1:≤~6), such that the liquid resin agent is capable of acting primarily as a non-hardening consolidating agent. In some embodiments, the ratio of the multifunctional electrophilic compound to the nucleophilic compound forming the liquid resin agent is greater than about 3 to about 1 (≤~3:~1), such that the liquid resin agent is capable of acting primarily as a hardening consolidating agent. In other embodiments, ratios therebetween, in the range of between less than about 2 to about 1 to less than about 2 to less than about 10 (≤~2:1 to ≤~2:10), allow the liquid resin agent to behave as both a hardening consolidating agent and a non-hardening consolidating agent. One with ordinary skill in the art, with the benefit of this disclosure, will understand whether the liquid resin agent should possess predominantly hardening or non-hardening consolidating agent qualities or a combination thereof depending on the particular application.

In some embodiments, the multifunctional electrophilic compounds may be reacted with the nucleophilic compounds in situ in the wellbore. In those embodiments, a method is disclosed herein of treating a wellbore in a subterranean formation comprising providing a first portion and a second portion of a liquid resin agent. The first portion comprises a multifunctional electrophilic compound comprising at least two electrophilic reactive groups and the second portion comprises a nucleophilic compound selected from the group consisting of a dimer acid; a dimer diamine; any derivative thereof; and any combination thereof. The complete liquid resin agent may be formed by reacting the first portion and the second portion. A first solvent-based treatment fluid is provided comprising either the first or second portion of the liquid resin agent, and a second solvent-based treatment fluid is provided comprising the portion of the liquid resin agent not in the first solvent-based treatment fluid. In any order, the first solvent-based treatment fluid is introduced into the subterranean formation and the second solvent-based treatment fluid is introduced into the subterranean formation. In some embodiments, the treatment fluid that is first introduced into the subterranean formation may be used to, for example, fracture the subterranean formation. The two portions of the liquid resin agent may come into contact with one another in situ and react to form the complete liquid resin agent, which is thereafter cured. In some embodiments, the first portion of the liquid resin agent is the first solvent-based treatment fluid and the second portion of the liquid resin agent is in the second solvent-based treatment fluid. In other embodiments, the first portion of the liquid resin agent is in the second solvent-based treatment fluid and the second portion of the liquid resin agent is in the first solvent-based treatment fluid. In some embodiments, the first solvent-based treatment fluid or the second solvent-based treatment fluid may further comprise proppant particulates. When the first solvent-based treatment fluid comprises proppant particulates, the proppant particulates may be coated with the first portion of the liquid resin agent. When the second solvent-based treatment fluid comprises proppant particulates, the proppant particulates may be coated with the second portion of the liquid resin agent.

In some embodiments, it may be desirable to use an aqueous-based treatment fluid to deliver a portion of the liquid resin agent into the subterranean formation. For example, it may be preferred that the subterranean formation is fractured using an aqueous-based treatment fluid rather than a solvent-based treatment fluid. In other embodiments, it may be desirable that the aqueous-based treatment fluid is used to remove (or wash) certain attributes from the subterranean formation prior to or after introducing a solvent-based treatment fluid. In these embodiments, a method is described herein of treating a wellbore in a subterranean formation comprising providing a first portion and a second portion of a liquid resin agent may be provided wherein the first portion comprises a multifunctional electrophilic compound comprising at least two electrophilic reactive groups and the second portion comprises a nucleophilic compound selected from the group consisting of a dimer acid; a dimer diamine; any derivative thereof; and any combination thereof. The complete liquid resin agent may be formed by reacting the first portion and the second portion. An aqueous-based treatment fluid is provided comprising the first portion of the liquid resin agent, and a solvent-based treatment fluid is the second portion of the liquid resin agent. In any order, the aqueous treatment fluid is introduced into the subterranean formation and the solvent-based treatment fluid is introduced into the subterranean formation. In some embodiments, the treatment fluid that is first introduced into the subterranean formation may be used to, for example, fracture the subterranean formation. The two portions of the liquid resin agent may come into contact with one another in situ and react to form the complete liquid resin agent, which is thereafter cured. In some embodiments, the aqueous-based treatment fluid or the solvent-based treatment fluid may further comprise proppant particulates. When the aqueous-based treatment fluid comprises proppant particulates, the proppant particulates may be coated with the first portion of the liquid resin agent. When the solvent-based treatment fluid comprises proppant particulates, the proppant particulates may be coated with the second portion of the liquid resin agent.

In some embodiments, the liquid resin agent may further comprise an accelerator; a silane coupling agent; a surfactant; a solvent; a hydrolyzable ester; and any combination thereof. The accelerator may increase the cure kinetic of the liquid resin agent, particularly in low temperature environments. Suitable accelerators may include, but are not limited to, an organic amine; an inorganic base; and any combination thereof. Suitable organic amines for use as an accelerator may include, but are not limited to, a pyridine; an isoquinoline; a quinoline; a N,N-dimethylcyclohexylamine; a tributylamine; a tripropylamine; a N-ethylmorpholine; a dimethylaniline; a triethylamine; and any combination thereof. Suitable inorganic bases for use as an accelerator may include, but are not limited to, potassium hydroxide; sodium hydroxide; ammonium hydroxide; and any combination thereof. In some embodiments, the accelerator may be present in the liquid resin agent in an amount from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the combined multifunctional electrophilic compound and nucleophilic compound, and preferably in an amount from about 1% to about 3% by weight of the combined multifunctional electrophilic compound and nucleophilic compound.

A curing agent may be included in the liquid resin agent in order to facilitate curing of the liquid resin agent (i.e., by decreasing curing time). Suitable curing agents may include polyacids including, but not limited to, a $C_{36}$ dibasic acid; a dimer acid; a trimer acid; a synthetic acid produced from a fatty acid; a maleic anydride; an acrylic acid; and any combination thereof. In some embodiments, the curing agent used may be included in the liquid resin agent in the range of a lower limit of about 0.1%, 1%, 10%, 20%, 30%, 40%, and 50% to an upper limit of about 95%, 90%, 85%, 80%, 75%, 70%, 65%, 60%, 55%, and 50% by weight of the combined multifunctional electrophilic compound and nucleophilic compound. In other embodiments, the curing agent used may be included in the liquid resin agent in an amount in the range of from about 15% to about 85% by weight of the combined multifunctional electrophilic compound and nucleophilic compound. In still other embodiments, the curing agent used may be included in the liquid resin agent in an amount in the range of from about 15% to about 55% by weight of the combined multifunctional electrophilic compound and nucleophilic compound.

In some embodiments, the curing agent of the present invention may be coated onto proppant particulates and then introduced to the liquid resin agent. This may facilitate curing of the liquid resin agent onto the proppant particulates. When the proppant particulates disclosed herein are coated with the liquid resin agent, they may be introduced into a subterranean formation either in a solvent-based treatment fluid or an aqueous-based treatment fluid, both of which may be adequate to act as a carrier fluid for delivery of the coated proppant particulates to a downhole location. In other embodiments, the curing agent may be coated onto the proppant particulates and then further encapsulated with a degradable coating (e.g., a degradable polymer that degrades downhole) that delays the interaction of the liquid resin agent and the curing agent until a desired time or place within the wellbore.

The optional silane-coupling agent for use in the liquid resin agent described herein may be used, among other things, to act as a mediator to help bond the liquid resin agent to a substrate, such as the surface of the face of a subterranean formation or proppant particulates. Suitable silane coupling agents may include, but are not limited to, N-2-(aminoethyl)-3-aminopropyltrimethoxysilane; 3-glycidoxypropyltrimethoxysolane; n-beta-(aminoethyl)-gamma-aminopropyl trimethoxysilane; and any combination thereof. The silane coupling agent may be included in the liquid resin agent according to the chemistry of the particular group as determined by one skilled in the art with the benefit of this disclosure. In some embodiments, the silane-coupling agent used may be included in the liquid resin agent in the range of a lower limit of about 0.1%, 0.25%, 0.5%, 0.75%, 1%, 1.25%, and 1.5% to an upper limit of about 3%, 2.75%, 2.5%, 2.25%, 2%, 1.75%, and 1.5% by weight of the combined multifunctional electrophilic compound and nucleophilic compound.

A surfactant may further be used in the liquid resin agent described herein to facilitate coating of the liquid resin agent onto a suitable substrate. Any surfactant compatible with the multifunctional electrophilic compound and the nucleophilic compound may be used. Suitable surfactants may include, but are not limited to, an alkyl phosphonate surfactant (e.g., a $C_{12}$-$C_{22}$ alkyl phosphonate surfactant); an ethoxylated nonyl phenol phosphate ester; one or more cationic surfactants; and one or more nonionic surfactants; and any combination thereof. The surfactant or surfactants that may be used in the liquid resin agent may be present in an amount in the range of a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the combined multifunctional electrophilic compound and nucleophilic compound.

In some embodiments, a silane coupling agent and a surfactant of the present invention may be used to facilitate coating of the liquid resin agent onto a suitable substrate. In other embodiments, only one of the silane coupling agent or the surfactant is included in the liquid resin agent. One of ordinary skill in the art, with the benefit of this disclosure, will understand whether one or both of the silane coupling agent and surfactant will be of use in a particular application.

An optional solvent may be included in the liquid resin agent to reduce the viscosity of the liquid resin agent (i.e., to enhance the pumpability of the liquid resin agent through subterranean formation operational equipment). Suitable solvents may include, but are not limited to, butyl lactate; butylglycidyl ether; dipropylene glycol methyl ether; dipropylene glycol dimethyl ether; dimethyl formamide; diethylene glycol methyl ether; ethyleneglycol butyl ether; diethylene glycol butyl ether; propylene carbonate; methanol; butyl alcohol; d'limonene; fatty acid methyl esters; isopropanol; 2-butyoxy ethanol; an ether of a C2 to C6 dihydric alkanol containing at least one C1 to C6 alkyl group; a monoether of dihydric alkanol; methoxypropanol; butoxyethanol; hexoxyethanol; any isomer thereof; and any combination thereof. In some embodiments, those solvents having high flash points of above about 125° F. may be preferred. It is within the ability of one skilled in the art, with the benefit of this disclosure, to determine if and how much solvent may be needed to achieve a suitable viscosity. In some embodiments, the amount of the solvent used in the liquid resin agent may be in the range of a lower limit of about 0.1%, 1%, 2.5%, 5%, 7.5%, 10%, 12.5%, and 15% to about 30%, 27.5%, 25%, 22.5%, 20%, 17.5%, and 15% by weight of the combined multifunctional electrophilic compound and nucleophilic compound.

A hydrolyzable ester may be included in the liquid resin agents of the embodiments described herein to further reduce the viscosity of the liquid resin agent. Suitable examples of hydrolyzable esters that may be used in the liquid resin agent may include, but are not limited to, dimethylglutarate; dimethyladipate; dimethylsuccinate; sorbitol; catechol; dimethylthiolate; methyl salicylate; dimethyl salicylate; dimethylsuccinate; ter-butylhydroperoxide; butyl lactate; and any combination thereof. When used, a hydrolyzable ester may be included in the liquid resin agent in an amount in the range of a lower limit of about 0.1%, 0.25%, 0.5%, 1%, 1.25%, and 1.5% to an upper limit of about 3%, 2.75%, 2.5%, 2.25%, 2%, 1.75%, and 1.5% by weight of the combined multifunctional electrophilic compound and nucleophilic compound. In some embodiments, a hydrolyzable ester may be included in the liquid resin agent in an amount in the range of about 1% to about 2.5% by weight of the combined multifunctional electrophilic compound and nucleophilic compound.

In some embodiments, a solvent and a hydrolyzable ester may be used to control the viscosity of the liquid resin agent. In other embodiments, only one of the solvent or the hydrolyzable ester may be included in the liquid resin agent. One of ordinary skill in the art, with the benefit of this disclosure, will understand whether one or both of the solvent or the hydrolyzable ester may be of use in a particular application. Optionally, the liquid resin agent may be heated to reduce its viscosity, in place of, or in addition to, using a solvent and/or a hydrolyzable ester.

The first and second solvent-based treatment fluid (collectively referred to herein as "solvent-based treatment fluids") may be identical or different fluids comprised of any suitable solvent-based treatment fluid that may be used in a subterranean formation that is compatible with the liquid resin agents described herein. Suitable solvents may include, but are not limited to, a butyl lactate; a glycol ether; a dimethyl formamide; a propylene carbonate; a methanol; an isopropanol; a butyl alcohol; a d'limonene; a fatty acid methyl ester; a butylglycidyl ether; any derivative thereof; and any combination thereof. Suitable glycol ethers may include, but are not limited to, a diethylene glycol methyl ether; a dipropylene glycol methyl ether; an ethylene glycol butyl ether; a diethylene glycol butyl ether; a 2-butoxy ethanol; an ether of a $C_2$ to $C_6$ dihydric alkanol containing at least one $C_1$ to $C_6$ alkyl group; a mono ether of a dihydric alkanol; a mono ether of a methoxypropanol; a mono ether of a butoxyethanol; a mono ether of a hexoxyethanol; any isomers thereof; any derivatives thereof; and any combination thereof. Selection of an appropriate solvent is dependent on the resin composition chosen and is within the ability of one skilled in the art, with the benefit of this disclosure.

The aqueous-based treatment fluids described in some embodiments herein may include, but are not limited to fresh water; saltwater (e.g., water containing one or more salts dissolved therein); brine (e.g., saturated saltwater); seawater; and any combination thereof. Generally, the aqueous-based treatment fluid (i.e., the water) may be from any source, provided that it does not contain components that might adversely affect the stability and/or performance of the aqueous-based treatment fluids described herein. The aqueous-based treatment fluids may also be aqueous-miscible base fluids including, but not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous fluid described above; any derivative thereof; and any combination thereof.

In certain embodiments, the viscosity of the first or second solvent-based treatment fluids or the aqueous-based treatment fluids may be adjusted, among other purposes, to change their viscosity (e.g., to provide additional proppant particulate transport and suspension). In these embodiments, the pH may be adjusted to a specific level, which may depend on, among other factors, the types of gelling agents, acids, and other additives included therein. One of ordinary skill in the art, with the benefit of this disclosure, will recognize when such pH adjustments are appropriate. In some embodiments, the pH range may preferably be from about 4 to about 11.

In some embodiments, the first or second solvent-based treatment fluids or the aqueous-based treatment fluids may be gelled with a gelling agent, to increase the viscosity of the fluid to aid in, among other things, transporting proppant particulates or other additives in the fluids. Suitable gelling agents may comprise any substance (e.g., a polymeric material) capable of increasing the viscosity of the fluids disclosed herein. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally occurring gelling agents; synthetic gelling agents; or a combination thereof. The gelling agents also may be cationic gelling agents; anionic gelling agents; or a combination thereof. Suitable gelling agents include, but are not limited to, polysaccharides; biopolymers; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof. In certain embodiments, the gelling agents comprise an organic carboxylated polymer, such as CMHPG. An example of a suitable commercially available gelling agent is WG-35™ Gelling Agent, available from Halliburton Energy Services, Inc. in Houston, Tex.

Suitable synthetic polymer gelling agents may include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride; acrylic acid; dimethylaminoethyl methacrylamide; dimethylaminoethyl methacrylate; dimethylaminopropyl methacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivatives thereof; and any combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the first or second solvent-based treatment fluids or the aqueous-based treatment fluids useful in the methods described herein in an amount sufficient to provide the desired viscosity. In some embodiments, the gelling agents may be present in an amount in the range of from a lower limit of about 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the solvent-based treatment fluid (whether first or second) or the aqueous-based treatment fluid. In other embodiments, the gelling agents may be present in an amount in the range of from about 0.15% to about 2.5% by weight of the first or second solvent-based treatment fluid or the aqueous-based treatment fluid.

In those embodiments described herein where it is desirable to crosslink the gelling agent, the fluid may further comprise one or more crosslinking agents. The crosslinking agents may comprise a borate ion; a metal ion; or similar component that is capable of crosslinking at least two molecules of the gelling agent. Examples of suitable crosslinking agents may include, but are not limited to, borate ions; magnesium ions; zirconium IV ions; titanium IV ions; aluminum ions; antimony ions; chromium ions; iron ions; copper ions; magnesium ions; and zinc ions. These ions may be provided by providing any compound that is capable of producing one or more of these ions. Examples of such compounds may include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combinations thereof. In certain embodiments, the crosslinking agent may be formulated to remain inactive until it is "activated" by, among other things, certain conditions in the first or second solvent-based treatment fluid or the aqueous-based treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art including, but not limited to, the type of gelling agent(s) included, the molecular weight of the gelling agent(s), the conditions in the subterranean formation being treated, the safety handling requirements, the pH of the treatment fluids (solvent-based or aqueous-based), temperature, and/or the desired delay for the crosslinking agent to crosslink the gelling agent molecules.

When included, suitable crosslinking agents may be present in the fluids useful in the methods described herein in an amount sufficient to provide the desired degree of crosslinking between molecules of the gelling agent(s). In certain embodiments, the crosslinking agent may be present in an amount in the range of from a lower limit of about 0.005%, 0.01%, 0.02%, 0.03%, 0.04%, 0.05%, 0.06%, 0.07%, 0.08%, 0.09%, and 0.1% to an upper limit of about 1%, 0.9%, 0.8%, 0.7%, 0.6%, 0.5%, 0.4%, 0.3%, 0.2%, and 0.1% by weight of the solvent-based (first or second) treatment fluid or the aqueous-based treatment fluid. In certain embodiments, the crosslinking agent may be present in the fluids of the present invention in an amount in the range of from about 0.05% to about 1% by weight of the fluid. One of ordinary skill in the art, with the benefit of this disclosure, will recognize the appropriate amount of crosslinking agent to include in a fluid of the present invention.

In some embodiments, the first or second solvent-based treatment fluid or the aqueous-based treatment fluid may further comprise a weighting agent. The weighting agent may aid in generating hydrostatic pressure needed to circulate the fluids to the wellbore head. Suitable weighing agents may include, but are not limited to, hollow mineral glass spheres; hollow glass microspheres; cenospheres; ceramic microspheres; polymeric microspheres; plastic microspheres; silica; ilmenite; hematite; barite; cementitious material; manganese tetraoxide; and any combination thereof. In certain embodiments, the weighting agent may be present in an amount up to about 70% by volume of the first or second solvent-based treatment fluid or the aqueous-based treatment fluid (v %) (e.g., about 5%, about 15%, about 20%, about 25%, about 30%, about 35%, about 40%, about 45%, about 50%, about 55%, about 60%, about 65%, etc.). In certain embodiments, the weighting agent may be present in the range of from about 10 v % to about 40 v %.

Suitable proppant particulates may comprise any material suitable for use in a subterranean operation and may include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials may include, but is not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean size of the proppant particulates generally may range from about 2 mesh to about 400 mesh on the U.S. Sieve Series, or even higher; however, in certain circumstances, other mean sizes may be desired and will be entirely suitable for practice of the present invention. In particular embodiments, the preferred mean size distribution of the proppant particulates ranges are one or more of 6/12, 8/16, 12/20, 16/30, 20/40, 30/50, 40/60, 40/70, or 50/70 mesh. It should be understood that the term "proppant particulate" or "particulate," as used in this disclosure, includes all known shapes of materials, including substantially spherical materials; fibrous materials; polygonal materials (e.g., cubic materials); and any combination thereof. Moreover, fibrous materials may be included in certain embodiments of the present invention. In certain embodiments, the proppant particulates may be present in the first or second solvent-based treatment fluid or the aqueous-based treatment fluid in an amount in the range of from a lower limit of about 0.5 pounds per gallon ("ppg"), 1 ppg, 5 ppg, 10 ppg, and 15 ppg to an upper limit of about 30 ppg, 25 ppg, 20 ppg, and 15 ppg by volume of the treatment first or second solvent-based treatment fluid or the aqueous-based treatment fluid.

In various embodiments, systems configured for delivering the liquid resin agents in the first or second solvent-based treatment fluids or the aqueous-based treatment fluids (collectively "treatment fluids") described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver the treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity.

Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method of treating a subterranean formation comprising: providing a solvent-based treatment fluid comprising a liquid resin agent, wherein the liquid resin agent comprises the reaction product of a multifunctional electrophilic compound comprising at least two electrophilic reactive groups and at least one nucleophilic compound selected from the group consisting of a dimer acid; a dimer diamine; any derivative thereof; and any combination thereof, and wherein the multifunctional electrophilic compound comprises at least two electrophilic reactive groups; introducing the solvent-based treatment fluid into the subterranean formation; and curing the liquid resin agent.

B. A method of treating a subterranean formation comprising: providing a first portion and a second portion of a liquid resin agent, wherein the first portion comprises a multifunctional electrophilic compound comprising at least two electrophilic reactive groups, wherein the second portion comprises at least one nucleophilic compound selected from the group consisting of a dimer acid; a dimer diamine; any derivative thereof; and any combination thereof, and wherein a complete liquid resin agent is formed by a reaction of the first portion and the second portion; providing a first solvent-based treatment fluid comprising either the first portion or the second portion of the liquid resin agent; providing a second solvent-based treatment fluid comprising the portion of the liquid resin agent not in the first solvent-based treatment fluid, introducing the first solvent-based treatment fluid into the subterranean formation; introducing the second solvent-based treatment fluid into the subterranean formation; reacting the first portion and the second portion of the liquid resin agent so as to form the complete liquid resin agent; and curing the liquid resin agent.

C. A method of treating a subterranean formation comprising: providing a first portion and a second portion of a liquid resin agent, wherein the first portion comprises a multifunctional electrophilic compound comprising at least two electrophilic reactive groups, wherein the second portion comprises at least one nucleophilic compound selected from the group consisting of a dimer acid; a dimer diamine; any derivative thereof; and any combination thereof, and wherein a complete liquid resin agent is formed by a reaction of the first portion and the second portion; providing an aqueous-based treatment fluid comprising the first portion of the liquid resin agent; providing a solvent-based treatment fluid comprising the second portion of the liquid resin agent, introducing the aqueous-based treatment fluid into the subterranean formation; introducing the solvent-based treatment fluid into the subterranean formation; reacting the first portion and the second portion of the liquid resin agent so as to form the complete liquid resin agent; and curing the liquid resin agent.

Each of embodiments A, B, and C may have one or more of the following additional elements in any combination:

Element 1: Wherein the multifunctional electrophilic compound is selected from the group consisting of a polyepoxide; an epoxy containing alkoxysilane; and any combination thereof.

Element 2: Wherein the polyepoxide is selected from the group consisting of a bisphenol A diglycidyl ether; a bisphenol A-epichlorohydrin; a bisphenol F; novolak; a tetrabromobisphenol A; an aliphatic diepoxide; and any combination thereof.

Element 3: Wherein the epoxy containing alkoxysilane comprises the formula: $R_nR'_mSiX_{(4-n-m)}$, where R' is a nonhydrolyzable organic group functionalized with an epoxy end group, R is a nonhydrolyzable organic group, X is a hydrolyzable group, and n and m are integers.

Element 4: Wherein the nonhydrolyzable organic group R is selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof, and wherein the hydrolyzable organic group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

Element 5: Wherein the ratio of the multifunctional electrophilic compound to the nucleophilic compound forming the liquid resin agent is about 1 to greater than about 6.

Element 6: Wherein the ratio of the multifunctional electrophilic compound to the nucleophilic compound forming the liquid resin agent is greater than about 3 to about 1.

Element 7: Wherein the ratio of the multifunctional electrophilic compound to the nucleophilic compound forming the liquid resin agent is in the range of between less than about 2 to about 1 to less than about 2 to less than about 10.

Element 8: Wherein the liquid resin agent further comprises at least one selected from the group consisting of an accelerator; a silane coupling agent; a surfactant; a solvent; a hydrolyzable ester; and any combination thereof.

Element 9: Wherein the solvent-based treatment fluid further comprises proppant particulates, and wherein the liquid resin agent present in the solvent-based treatment fluid is coated onto the proppant particulates.

Element 9: Wherein the first solvent-based treatment fluid or the second solvent-based treatment fluid further comprises proppant particulates, and wherein the proppant particulates are coated with the first portion when present in the first solvent-based treatment fluid and wherein the proppant particulates are coated with the second portion when present in the second solvent-based treatment fluid.

Element 10: Wherein the first portion of the liquid resin agent is in the first solvent-based treatment fluid and the second portion of the liquid resin agent is in the second solvent-based treatment fluid.

Element 11: Wherein the first portion of the liquid resin agent is in the second solvent-based treatment fluid and the second portion of the liquid resin agent is in the first solvent-based treatment fluid.

Element 12: Wherein the aqueous-based treatment fluid or the solvent-based treatment fluid further comprises proppant particulates, and wherein the proppant particulates are coated with the first portion when present in the aqueous-based treatment fluid and wherein the proppant particulates are coated with the second portion when present in the solvent-based treatment fluid.

By way of non-limiting example, exemplary combinations applicable to A, B, C include: A with 2, 7, and 8; A with 1, 3, 5, and 6; B with 1, 2, and 9; B with 3, 6, 10, and 11; C with 5, 6, 7, and 8; and C with 9 and 12.

To facilitate a better understanding of the embodiments described herein, the following examples of preferred or representative embodiments are given. In no way should the following examples be read to limit, or to define, the scope of the invention.

EXAMPLE 1

In this example, a liquid resin agent comprising 0.33 g of bisphenol A diepoxy (multifunctional electrophilic compound), 2.67 g of dimer acid (nucleophilic compound), 0.1 g triethylamine (accelerator), and 0.1 g SILQUEST® A-1120 (silane coupling agent) was coated onto 100 g of 20/40-mesh Brady sand (proppant particulates). The coated proppant particulates were suspended in 50 g of 3% KCl (aqueous-based treatment fluid) in a glass vial. The mixture was rotated continuously in the glass vial in a rolling oven for 24 hours at 93.3° C. (200° F.). Thereafter, the mixture was washed with 100 g of tap water 3 times. Next, 100 g of kerosene was added to the mixture in the glass vial, followed by vigorous shaking for approximately 3 minutes. After shaking the mixture, the kerosene was decanted and again rinsed with tap water to remove all visibly present kerosene. After removal of the kerosene, 0.5 g of coal fines were added to the mixture and the mixture was vigorously shaken for 1-2 min.

Based on visual inspection, the bisphenol A diepoxy and dimer acid were capable of reacting to form the liquid resin agent, which was capable of being wet-coated onto the proppant particulates within 24 hours at 93.3° C. (200° F.). The presence of the hydrocarbon kerosene did not remove the liquid resin agent from the proppant particulates. The liquid resin agent of this example, comprising a ratio of approximately 1 to approximately 8 multifunctional electrophilic compound to nucleophilic compound, demonstrated strong non-hardening consolidating agent qualities, as indicated by adherence of the coal fines to the coated proppant particulates rather than their accumulation in the aqueous carrier fluid lacking the coated proppant particulates.

EXAMPLE 2

In this example, a liquid resin agent comprising 0.33 g of bisphenol A diepoxy (multifunctional electrophilic compound), 2.67 g of dimer acid (nucleophilic compound), 0.1 g triethylamine (accelerator), and 0.1 g SILQUEST® A-1120 (silane coupling agent) was coated onto 100 g of 20/40-mesh Brady sand (proppant particulates). The coated proppant particulates were suspended in 100 g of 25 lbs/Mgal WG-36™ in aqueous-based polysaccharide fluid (gelled aqueous-based treatment fluid) in a glass vial. The mixture was vigorously shaken for approximately 1 minute at ambient temperature. Thereafter, the liquid component of the mixture (i.e., the gelled aqueous-based treatment fluid) was decanted and the remaining solid component was washed with 100 g of tap water 3 times. Next, 100 g of kerosene was added to the mixture in the glass vial, followed by vigorous shaking for approximately 3 minutes. After shaking the mixture, the kerosene was decanted and again rinsed with tap water to remove all visibly present kerosene. After removal of the kerosene, 0.5 g of coal fines were added to the mixture and the mixture was vigorously shaken for 1-2 min.

Based on visual inspection, the bisphenol A diepoxy and dimer acid were capable of reacting to form the liquid resin agent, which was capable of being wet-coated onto the proppant particulates within 1 min during vigorous shaking at ambient temperature. The presence of the hydrocarbon kerosene did not remove the liquid resin agent from the proppant particulates. The liquid resin agent of this example, comprising a ratio of approximately 1 to approximately 8 multifunctional electrophilic compound to nucleophilic compound, demonstrated strong non-hardening consolidating agent qualities, as indicated by adherence of the coal fines to the coated proppant particulates rather than their accumulation in the gelled aqueous-based treatment fluid lacking the coated proppant particulates.

EXAMPLE 3

In this example, a liquid resin agent of 3 g of bisphenol A diepoxy (multifunctional electrophilic compound), 10 g of dimer acid (nucleophilic compound), and 0.1 g triethylamine (accelerator) was coated onto 100 g of 20/40-mesh Brady sand (proppant particulates). The coated proppant particulates were suspended in 50 g of 3% KCl (aqueous-based treatment fluid) in a glass vial. The mixture was rotated continuously in the glass vial in a rolling oven for 24 hours at 93.3° C. (200° F.). Thereafter, the mixture was washed with 100 g of tap water 3 times. Next, 100 g of kerosene was added to the mixture in the glass vial, followed by vigorous shaking for approximately 3 minutes. After shaking the mixture, the kerosene was decanted and again rinsed with tap water to remove all visibly present kerosene. After removal of the kerosene, 0.5 g of coal fines were added to the mixture and the mixture was vigorously shaken for 1-2 min.

Based on visual inspection, the bisphenol A diepoxy and dimer acid were capable of reacting to form the liquid resin agent, which was capable of being wet-coated onto the proppant particulates within 24 hours at 93.3° C. (200° F.). The presence of the hydrocarbon kerosene did not remove the liquid resin agent from the proppant particulates. The liquid resin agent of this example, comprising a ratio of approximately 1 to approximately 8 multifunctional electrophilic compound to nucleophilic compound, demonstrated strong non-hardening consolidating agent qualities, as indicated by adherence of the coal fines to the coated proppant particulates rather than their accumulation in the aqueous-based treatment fluid lacking the coated proppant particulates.

EXAMPLE 4

In this example, a liquid resin agent comprising 3 g of bisphenol A diepoxy (multifunctional electrophilic compound), 10 g of dimer acid (nucleophilic compound), and 0.1 g triethylamine (accelerator) was added to a glass vial. The mixture was static incubated in the glass vial for 48 hours at 107.2° C. (225° F.). After 48 hours, 3 g of the liquid resin agent was added to 100 g of 20/40-mesh Brady sand (proppant particulates) to dry-coat the liquid resin agent onto the proppant particulates at room temperature. After dry-coating, 100 g of 3% KCl (aqueous-based treatment fluid) and 0.5 g of coal fines was added and the contents were shaken vigorously for approximate 1-2 min.

Based on visual inspection, the bisphenol A diepoxy and dimer acid were capable of reacting to form the liquid resin agent within 4 hours at 107.2° C. (225° F.), which was capable of being dry-coated onto the proppant particulates. The liquid resin agent of this example, comprising a ratio of approximately 1 to approximately 3 multifunctional electrophilic compound to nucleophilic compound, demonstrated strong non-hardening consolidating agent qualities, as indicated by adherence of the coal fines to the coated proppant particulates rather than their accumulation in the aqueous-based treatment fluid lacking the coated proppant particulates.

EXAMPLE 5

In this example, a liquid resin agent comprising 3 g of bisphenol A diepoxy (multifunctional electrophilic compound), 10 g of dimer acid (nucleophilic compound), and 0.1 g triethylamine (accelerator) was added to a glass vial. The mixture was incubated static in the glass vial for 48 hours at 107.2° C. (225° F.). After 48 hours, approximately 100 g of kerosene was added to the mixture and immediately visually inspected. Upon visual inspection, the liquid resin component was insoluble in the kerosene, demonstrating that the bisphenol A diepoxy and the dimer acid were capable of reacting to form the liquid resin agent in the presence of the kerosene, an organic compound that may be present in a subterranean formation.

EXAMPLE 6

In this example, a liquid resin agent comprising 3 g of bisphenol A diepoxy (multifunctional electrophilic compound), 10 g of dimer acid (nucleophilic compound), and 0.1 g triethylamine (accelerator) was added to a glass vial. The mixture was static incubated in the glass vial for 48 hours at 107.2° C. (225° F.). After 48 hours, 3 g of the liquid resin agent was added to 100 g of 20/40-mesh Brady sand (proppant particulates) to dry-coat the liquid resin agent onto the proppant particulates at room temperature. After dry-coating, 200 g of 3% KCl (aqueous-based treatment fluid) was added to the coated proppant particulates and mixed vigorously. After 1 minute, the 3% KCl was decanted and the coated proppant particulates were packed into a 12.7 cm (5 in) long column having an inner diameter of 2.54 cm (1 in). The column was capped and placed in an oven at 107.2° C. (225° F.) for 48 hours to form a hardened resinous mass. The hardened resinous mass was sliced into 2.54 cm×5.08 cm (1-inch×2-inch) samples and the slices were tested for unconfined compressive strength ("UCS") measurements using an Instron 5550.

The liquid resin agent of this example, comprising a ratio of approximately 1 to approximately 3 multifunctional electrophilic compound to nucleophilic compound, demonstrated an average USC of 58 psi (399895.9 Pa). Additionally, the slices tested for USC measurements did not crumble but exhibited elasticity under the stress load.

EXAMPLE 7

In this example, a liquid resin agent comprising 1 g of 1,4-di(oxiran-2-yl)butane (multifunctional electrophilic compound), 6 g of dimer acid (nucleophilic compound), and 0.1 g triethylamine (accelerator) was coated onto 100 g of 20/40-mesh Brady sand (proppant particulates). The coated proppant particulates were suspended in 50 g of 3% KCl (aqueous-based treatment fluid) in a glass vial. The mixture was rotated continuously in the glass vial in a rolling oven for 24 hours at 93.3° C. (200° F.). Thereafter, the mixture was washed with 100 g of tap water 3 times. Next, 100 g of kerosene was added to the mixture in the glass vial, followed by vigorous shaking for approximately 3 minutes. After shaking the mixture, the kerosene was decanted and again rinsed with tap water to remove all visibly present kerosene. After removal of the kerosene, 0.5 g of coal fines were added to the mixture and the mixture was vigorously shaken for 1-2 min.

Based on visual inspection, the 1,4-di(oxiran-2-yl)butane and dimer acid were capable of reacting to form the liquid resin agent, which was capable of being wet-coated onto the proppant particulates within 24 hours at 93.3° C. (200° F.). The presence of the hydrocarbon kerosene did not remove the liquid resin agent from the proppant particulates. The liquid resin agent of this example, comprising a ratio of approximately 1 to approximately 6 multifunctional electrophilic compound to nucleophilic compound, demonstrated strong non-hardening consolidating agent qualities, as indicated by adherence of the coal fines to the coated proppant particulates rather than their accumulation in the aqueous-based treatment fluid lacking the coated proppant particulates. A portion of the liquid resin agent was also observed as exhibiting hardening consolidating agent qualities.

EXAMPLE 8

In this example, a liquid resin agent comprising 1 g of 1,4-di(oxiran-2-yl)butane (multifunctional electrophilic compound), 6 g of dimer acid (nucleophilic compound), and 0.1 g triethylamine (accelerator) was added to a glass vial. The mixture was static incubated in the glass vial for 48 hours at 225° F. (107.2° C.). After 48 hours, 3 g of the liquid resin agent was added to 100 g of 20/40-mesh Brady dry sand (proppant particulates) to dry-coat the liquid resin agent onto the sand at room temperature. After dry-coating, 100 g of 3% KCl (aqueous-based treatment fluid) and 0.5 g of coal fines was added and the contents were shaken vigorously for approximately 1-2 min.

Based on visual inspection, the 1,4-di(oxiran-2-yl)butane and dimer acid were capable of reacting to form the liquid resin agent within 4 hours at 107.2° C. (225° F.), which was capable of being dry-coated onto the proppant particulates. The liquid resin agent of this example, comprising a ratio of approximately 1 to approximately 6 multifunctional electrophilic compound to nucleophilic compound, demonstrated strong non-hardening consolidating agent qualities, as indicated by adherence of the coal fines to the coated proppant particulates rather than their accumulation in the aqueous-based treatment fluid lacking the coated proppant particulates. A portion of the liquid resin agent was also observed as exhibiting hardening consolidating agent qualities, having a compressive strength of 41 psi (282685.0 Pa).

EXAMPLE 9

In this example, a liquid resin agent comprising 1 g of 1,4-di(oxiran-2-yl)butane (multifunctional electrophilic compound), 6 g of dimer acid (nucleophilic compound), and 0.1 g triethylamine (accelerator) was added to a glass vial. The mixture was static incubated in the glass vial for 48 hours at 107.2° C. (225° F.). After 48 hours, approximately 100 g of kerosene was added to the mixture. Upon immediate visual inspection, the liquid resin component was insoluble in the kerosene, demonstrating that the bisphenol A diepoxy and the dimer acid were capable of reacting to form the liquid resin agent in the presence of the kerosene, an organic compound that may be present in a subterranean formation.

EXAMPLE 10

In this example, a liquid resin agent comprising 1 g of 1,4-di(oxiran-2-yl)butane (multifunctional electrophilic compound), 6 g of dimer acid (nucleophilic compound), and 0.1 g triethylamine (accelerator) was added to a glass vial. The mixture was static incubated in the glass vial for 48 hours at 107.2° C. (225° F.). After 48 hours, 3 g of the liquid resin agent was added to 100 g of 20/40-mesh Brady sand (proppant particulates) to dry-coat the liquid resin agent onto the proppant particulates at room temperature. After dry-coating, 200 g of 3% KCl (aqueous-based treatment fluid) was added to the coated proppant particulates and mixed vigorously. After 1 minute, the 3% KCl was decanted and the coated proppant particulates were packed into a 12.7 cm (5 in) long column having an inner diameter of 2.54 cm (1 in). The column was capped and placed in an oven at 107.2° C. (225° F.) for 48 hours to form a hardened resinous mass. The hardened resinous mass was sliced into 2.54 cm×5.08 cm (1 in×2 in) samples and the slices were tested for unconfined compressive strength ("UCS") measurements using an Instron 5550.

The liquid resin agent of this example, comprising a ratio of approximately 1 to approximately 6 multifunctional electrophilic compound to nucleophilic compound, demonstrated an average USC of 50 psi (344737.9 Pa). Additionally, the slices tested for USC measurements did not crumble but exhibited elasticity under the stress load.

EXAMPLE 11

In this example, a liquid resin agent mixture comprising 3 g of bisphenol A-epichlorohydrin (multifunctional electrophilic compound) and 1 g of dimer diamine (nucleophilic compound) was prepared. After mixing the bisphenol A-epichlorohydrin and the dimer diamine, 3 g of the liquid resin agent mixture was added to 100 g of 20/40-mesh Brady sand (proppant particulates) to dry-coat the liquid resin agent onto the proppant particulates at room temperature. After dry-coating, 200 g of 3% KCl (aqueous-based treatment fluid) was added to the coated sand and mixed vigorously. After 1 minute, the 3% KCl was decanted and the coated proppant particulates were packed into a 12.7 cm (5 in) long column having an inner diameter of 2.54 cm (1 in).

The column was capped and placed in an oven at 107.2° C. (225° F.) for 24 hours to form a hardened resinous mass. The hardened resinous mass was sliced into 2.54 cm×5.08 cm (1 in×2 in) samples and tested for their unconfined compressive strength ("UCS") measurements using an Instron 5550.

The liquid resin agent of this example, comprising a ratio of approximately 3 to approximately 1 multifunctional electrophilic compound to nucleophilic compound, demonstrated an average USC of 1530 psi (10.5 MPa) psi). Additionally, the slices tested for USC measurements did not crumble but exhibited elasticity under the stress load.

EXAMPLE 12

In this example, a liquid resin agent mixture comprising 6 g of bisphenol A-epichlorohydrin (multifunctional electrophilic compound) and 3 g of dimer diamine (nucleophilic compound) was prepared. After mixing the bisphenol A-epichlorohydrin and the dimer diamine, 3 g of the liquid resin agent mixture was added to 100 g of 20/40-mesh Brady sand (proppant particulates) to dry-coat the liquid resin agent onto the proppant particulates at room temperature. After dry-coating, 200 g of 3% KCl (aqueous-based treatment fluid) was added to the coated sand and mixed vigorously. After 1 minute, the 3% KCl was decanted and the coated proppant particulates were packed into a 12.7 cm (5 in) long column having an inner diameter of 2.54 cm (1 in). The column was capped and placed in an oven at 107.2° C. (225° F.) for 24 hours to form a hardened resinous mass. The hardened resinous mass was sliced into 2.54 cm×5.08 cm (1 in×2 in) samples and the slices were tested for unconfined compressive strength ("UCS") measurements using an Instron 5550.

The liquid resin agent of this example, comprising a ratio of approximately 2 to approximately 1 multifunctional electrophilic compound to nucleophilic compound, demonstrated an average USC of 793 psi (5.5 MPa). Additionally, the slices tested for USC measurements did not crumble but exhibited elasticity under the stress load.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
   providing a solvent-based treatment fluid comprising a carrier fluid and liquid resin agent, and wherein the carrier fluid consists of a solvent, and wherein the solvent-based treatment fluid consists of a first solvent-based treatment fluid and a second solvent-based treatment fluid,
   wherein the first solvent-based treatment fluid and the second solvent-based treatment fluid are identical,
   wherein the liquid resin agent comprises the reaction product of a multifunctional electrophilic compound comprising at least two electrophilic reactive groups and at least one nucleophilic compound selected from the group consisting of a dimer acid; a dimer diamine; any derivative thereof; and any combination thereof,
   wherein the multifunctional electrophilic compound comprises at least two electrophilic reactive groups, and
   wherein (1) the ratio of the multifunctional electrophilic compound to the nucleophilic compound is about 1 to greater than about 6, such that the liquid resin agent is capable of acting as a non-hardening consolidating agent, (2) the ratio of the multifunctional electrophilic compound to the nucleophilic compound is greater than about 3 to about 1, such that the liquid resin agent is capable of acting as a hardening consolidating agent, or (3) the ratio of the multifunctional electrophilic compound to the nucleophilic compound is less than about 2 to 1 to less than about 2 to 10, such that a portion of the liquid resin agent is a non-hardening consolidating agent and a portion of the liquid resin agent is a hardening consolidating agent;
   introducing the solvent-based treatment fluid into the subterranean formation; and
   curing the liquid resin agent.

2. The method of claim 1, wherein the multifunctional electrophilic compound is selected from the group consisting of a polyepoxide; an epoxy containing alkoxysilane; and any combination thereof.

3. The method of claim 2, wherein the polyepoxide is selected from the group consisting of a bisphenol A diglycidyl ether; a bisphenol A-epichlorohydrin; a bisphenol F; novolak; a tetrabromobisphenol A; an aliphatic diepoxide; and any combination thereof.

4. The method of claim 2, wherein the epoxy containing alkoxysilane comprises the formula: $R_nR'_mSiX_{(4-n-m)}$, where R' is a nonhydrolyzable organic group functionalized with an epoxy end group, R is a nonhydrolyzable organic group, X is a hydrolyzable group, and n and m are integers.

5. The method of claim 4, wherein the nonhydrolyzable organic group R is selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof, and wherein the hydrolyzable organic group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

6. The method of claim 1, wherein the liquid resin agent further comprises at least one selected from the group consisting of an accelerator; a silane coupling agent; a surfactant; a solvent; a hydrolyzable ester; and any combination thereof.

7. The method of claim 1, wherein the solvent-based treatment fluid further comprises proppant particulates, and wherein the liquid resin agent present in the solvent-based treatment fluid is coated onto the proppant particulates.

8. A method of treating a subterranean formation comprising:
providing a first portion and a second portion of a liquid resin agent,
wherein the first portion comprises a multifunctional electrophilic compound comprising at least two electrophilic reactive groups,
wherein the second portion comprises at least one nucleophilic compound selected from the group consisting of a dimer acid; a dimer diamine; any derivative thereof; and any combination thereof, and
wherein a complete liquid resin agent is formed by a reaction of the first portion and the second portion;
providing a first solvent-based treatment fluid comprising (1) a first carrier fluid and (2) either the first portion or the second portion of the liquid resin agent, and wherein the first carrier fluid consists of a solvent,
providing a second solvent-based treatment fluid comprising (1) a second carrier fluid and (2) the portion of the liquid resin agent not in the first solvent-based treatment fluid, and wherein the second carrier fluid consists of a solvent,
wherein the first solvent-based treatment fluid and the second solvent-based treatment fluid are identical,
introducing the first solvent-based treatment fluid into the subterranean formation;
introducing the second solvent-based treatment fluid into the subterranean formation;
reacting the first portion and the second portion of the liquid resin agent so as to form the complete liquid resin agent,
wherein (1) the ratio of the multifunctional electrophilic compound to the nucleophilic compound is about 1 to greater than about 6, such that the complete liquid resin agent is capable of acting as a non-hardening consolidating agent, (2) the ratio of the multifunctional electrophilic compound to the nucleophilic compound is greater than about 3 to about 1, such that the compete liquid resin agent is capable of acting as a hardening consolidating agent, or (3) the ratio of the multifunctional electrophilic compound to the nucleophilic compound is less than about 2 to 1 to less than about 2 to 10, such that a portion of the liquid resin agent is a non-hardening consolidating agent and a portion of the complete liquid resin agent is a hardening consolidating agent; and
curing the complete liquid resin agent.

9. The method of claim 8, wherein the first solvent-based treatment fluid or the second solvent-based treatment fluid further comprises proppant particulates, and wherein the proppant particulates are coated with the first portion when present in the first solvent-based treatment fluid and wherein the proppant particulates are coated with the second portion when present in the second solvent-based treatment fluid.

10. The method of claim 8, wherein the first portion of the liquid resin agent is in the first solvent-based treatment fluid and the second portion of the liquid resin agent is in the second solvent-based treatment fluid.

11. The method of claim 8, wherein the first portion of the liquid resin agent is in the second solvent-based treatment fluid and the second portion of the liquid resin agent is in the first solvent-based treatment fluid.

12. The method of claim 8, wherein the multifunctional electrophilic compound is selected from the group consisting of a polyepoxide; an epoxy containing alkoxysilane; and any combination thereof.

13. The method of claim 8, wherein the liquid resin agent further comprises at least one selected from the group consisting of an accelerator; a silane coupling agent; a surfactant; a solvent; a hydrolyzable ester; and any combination thereof.

14. A method of treating a subterranean formation comprising:
providing a first portion and a second portion of a liquid resin agent,
wherein the first portion comprises a multifunctional electrophilic compound comprising at least two electrophilic reactive groups,
wherein the second portion comprises at least one nucleophilic compound selected from the group consisting of a dimer acid; a dimer diamine; any derivative thereof; and any combination thereof, and
wherein a complete liquid resin agent is formed by a reaction of the first portion and the second portion;
providing an aqueous-based treatment fluid comprising the first portion of the liquid resin agent;
providing a solvent-based treatment fluid comprising a carrier fluid and the second portion of the liquid resin agent, and wherein the carrier fluid is not aqueous-based and consists of a solvent selected from the group consisting of a butyl lactate; a glycol ether; a dimethyl formamide; a propylene carbonate; a methanol; an isopropanol; a butyl alcohol; a d'limonene; a fatty acid methyl ester; a butylglycidyl ether; any derivative thereof; and any combination thereof; and wherein the solvent-based treatment fluid consists of a first solvent-based treatment fluid and a second solvent-based treatment fluid;
wherein the first solvent-based treatment fluid and the second solvent-based treatment fluid are identical,
introducing the aqueous-based treatment fluid into the subterranean formation;
introducing the solvent-based treatment fluid into the subterranean formation;
reacting the first portion and the second portion of the liquid resin agent so as to form the complete liquid resin agent,
wherein (1) the ratio of the multifunctional electrophilic compound to the nucleophilic compound is about 1 to greater than about 6, such that the complete liquid resin agent is capable of acting as a non-hardening consolidating agent, (2) the ratio of the multifunctional electrophilic compound to the nucleophilic compound is greater than about 3 to about 1, such that the compete liquid resin agent is capable of acting as a hardening consolidating agent, or (3) the ratio of the multifunctional electrophilic compound to the nucleophilic compound is less than about 2 to 1 to less than about 2 to 10, such that a portion of the liquid resin agent is a non-hardening consolidating agent and a portion of the complete liquid resin agent is a hardening consolidating agent; and curing the complete liquid resin agent.

15. The method of claim 14, wherein the aqueous-based treatment fluid or the solvent-based treatment fluid further comprises proppant particulates, and wherein the proppant particulates are coated with the first portion when present in the aqueous-based treatment fluid and wherein the proppant particulates are coated with the second portion when present in the solvent-based treatment fluid.

16. The method of claim 14, wherein the multifunctional electrophilic compound is selected from the group consisting of a polyepoxide; an epoxy containing alkoxysilane; and any combination thereof.

17. The method of claim 14, wherein the liquid resin agent further comprises at least one selected from the group consisting of an accelerator; a silane coupling agent; a surfactant; a solvent; a hydrolyzable ester; and any combination thereof.

* * * * *

UNITED STATES PATENT AND TRADEMARK OFFICE
CERTIFICATE OF CORRECTION

PATENT NO. : 9,862,876 B2
APPLICATION NO. : 14/036582
DATED : January 9, 2018
INVENTOR(S) : Loan Vo et al.

Page 1 of 1

It is certified that error appears in the above-identified patent and that said Letters Patent is hereby corrected as shown below:

In the Claims

In Column 23, Line 53-54:
Replace "such that the compete liquid resin" with --such that the complete liquid resin--.

In Column 24, Line 62-63:
Replace "such that the compete liquid resin" with --such that the complete liquid resin--.

Signed and Sealed this
Seventeenth Day of April, 2018

Andrei Iancu
*Director of the United States Patent and Trademark Office*